Figure 1:
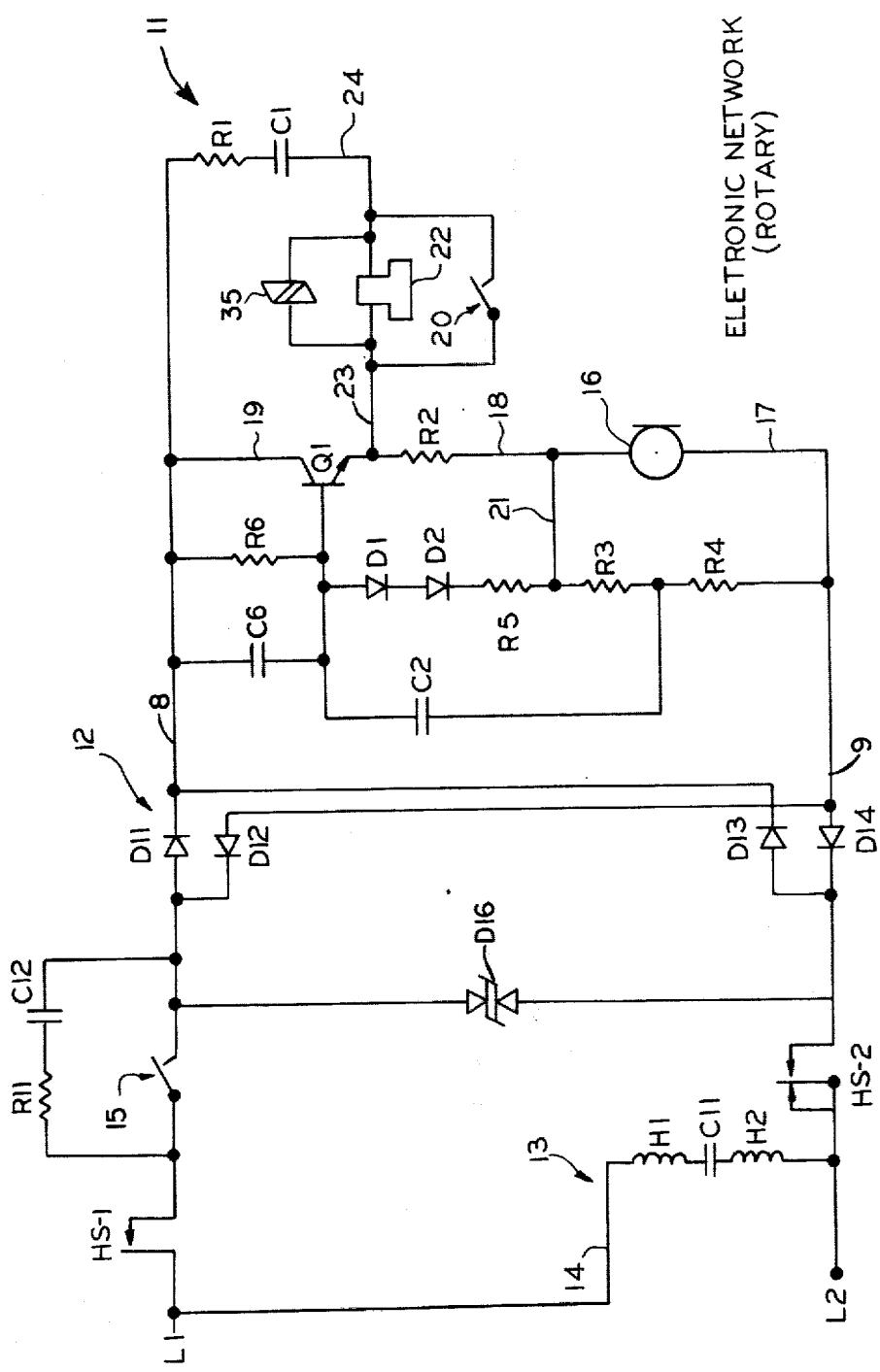

United States Patent [19]

Hestad et al.

[11] 4,314,107

[45] Feb. 2, 1982

[54] SUBSCRIBER STATION NETWORKS

[75] Inventors: Alfred M. Hestad, Chicago, Ill.; Michael Tentler, Kenosha, Wis.; Levi L. Rose, Chicago, Ill.

[73] Assignees: United Networks, Inc., Chicago, Ill.; Manu-Tronics, Inc., Kenosha, Wis.

[21] Appl. No.: 107,143

[22] Filed: Dec. 26, 1979

[51] Int. Cl.³ .............................................. H04M 1/58
[52] U.S. Cl. .................................. 179/81 R; 179/81 A
[58] Field of Search .............. 179/81 R, 84 R, 84 VF, 179/90 K, 16 F, 81 A, 170.2, 170.8

[56] References Cited

U.S. PATENT DOCUMENTS

| 3,064,084 | 11/1962 | Meacham | 179/90 K |
| 3,459,899 | 8/1969 | Lane et al. | 179/81 A |
| 3,971,896 | 7/1976 | Sekiguchi | 179/84 VF |

*Primary Examiner*—Bernard Konick
*Assistant Examiner*—J. A. Popek
*Attorney, Agent, or Firm*—Alter and Weiss

[57] ABSTRACT

A solid state subscriber station network which provides transmitting, receiving and regulating functions using a single active element. The transmitted signals, the received signals and the regulatory functions can be separately varied within proscribed limits without adversely affecting the other functions.

11 Claims, 2 Drawing Figures

SUBSCRIBER STATION NETWORKS

This invention is concerned with telephone systems; and more particularly, with improved networks for use in telephone subscriber stations.

The average user of the telephone knows that the telephone subscriber stations include a transmitting component and a receiving component. The more sophisticated users, of course, know that there are dial contacts, muting contacts, hook switch contacts and transformers, among other components in the normal telephone subscriber station network.

Essentially, though, the subscriber station network must provide a transmitter and accompanying circuitry for converting sound signals to electrical signals and transmit those signals over the telephone lines. In addition, a receiver must be provided which converts the electrical signals received over the telephone lines to sound signals. A portion of the transmitted signal is normally coupled to the receiver to provide side tone; otherwise, the user gets the impression that the instrument is dead.

The network also has to have the capability of regulating both the received and transmitted signals and to match the line impedance to accomodate variations in signal strength and line impedance such as those caused by variations in line length, or even weather conditions. Further, the telephone network must provide some type of dialing equipment for directing the telephone connections to called party stations through central offices. The dialing equipment for directing the call to a called party may consist of rotary dialing equipment or dual tone multi-frequency equipment.

Many attempts have been made in the past to provide subscriber station networks which use no inductive components; and therefore, are more amenable to hybridization and miniaturization. The hybrid-type networks provided in the past have required individualized components for assuring load matching and proper signal level, both in the receiving and the transmitting circuits. In addition, in the past, separate side tone circuitry has been required to control the amplitude of the side tone. Thus, the subscriber station networks previously provided using hybrid circuits have required a relatively large number of components. The more components used, the less reliable the network.

The application filed on Sept. 24, 1979 and given Ser. No. 078,517 and assigned to the assignee of this application reduced the components used. However, it has since been determined that it is possible to further reduce the number of active elements and nonetheless improve the performance of the circuit.

In the prior art networks, it has not been possible to vary only one of the network functions (transmitting, receiving and regulatory) without adversely affecting the remaining functions.

Accordingly, it is an object of the present invention to provide new and unique subscriber station networks.

Yet another object of the present invention is to provide solid state subscriber station networks wherein the amplitude of the transmitted signal remains substantially constant independently of the loop current.

Yet another object of the present invention is to provide amplification which will assure the proper level for both the transmitted signal and the received signal.

A related object of the present invention is to control the side tone by connecting the receiver across an amplifying element used in series with the transmitter.

Yet another object of the present invention is to use only one active amplifying element in the electronic network.

A preferred embodiment of the present invention comprises a solid-state subscriber station network which utilizes a single amplifying element in series with the transmitter bridging the telephone lines. The receiver is connected across the amplifying element. Since the amplitude of the transmitted speech signal appearing at the output of the amplifier is almost the same as that at the input, the receiver receives only a small part of the transmitted signal which serves as side tone.

Feedback circuitry controls the gain of the amplifying element. A negative feedback circuit automatically adjusts the gain of the amplifying element to accomodate line length.

The speech signals from the lines is coupled to the receiver through a series RC network. In addition, a portion of the received speech signal also passes through the amplifying element. Since the telephone line sees the amplifying element as part of the characteristic impedance of the network, it makes it possible to obtain the desired impedance, for example, six hundred ohms.

Figure 2:
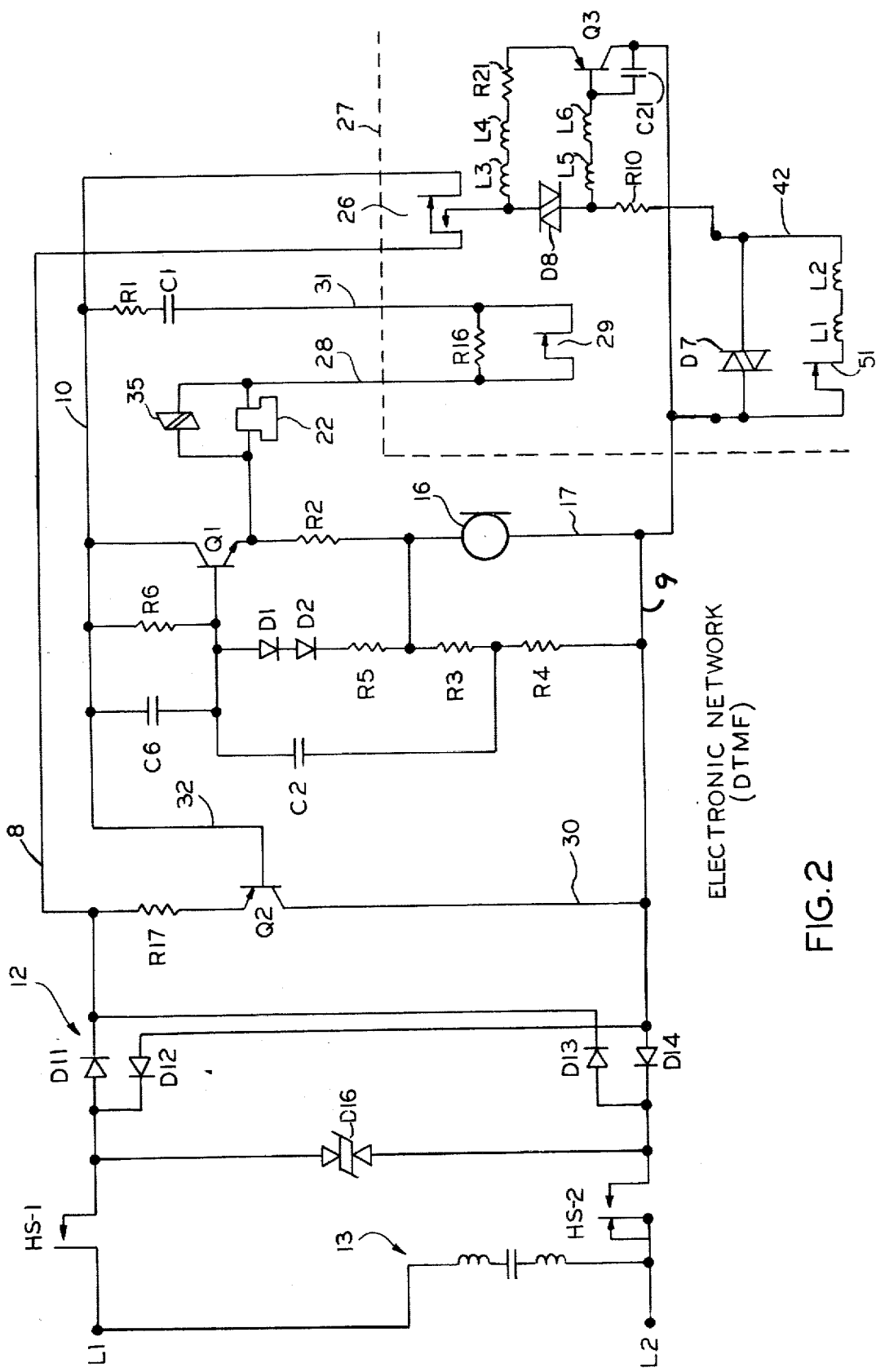

The above-mentioned and other and further features of the present invention will be best understood by making reference to the accompanying drawings, wherein:

FIG. 1 is a schematic of a solid-state subscriber station network connected with a rotary dial operated system; and FIG. 2 is a schematic of a solid-state subscriber station network connected with a multi-frequency tone operated system.

The subscriber station 11 shown in FIG. 1 includes a pair of telephone lines L1 and L2 connected through hook switch contacts HS-1, HS-2 and dial contacts 15 to a bridge circuit 12, comprised of a plurality of diodes D11, D12, D13 and D14. A ringer circuit 13 is shown comprising inductors H1 and H2 serially joined together by capacitor C11. The conductor leading to the ringers is shown as conductor 14 joined to the top side of inductor H1. The bottom side of inductor H2 is coupled to telephone line L2.

Dialing means, such as dial contacts 16 for the rotary dial, are shown serially in place in telephone line L1. The dial contacts are bridged by resistor R11 in series with capacitor C12.

The transmitting circuit comprises a transmitter 16 having one end coupled to conductor 9 through conductor 17 and the other end coupled to conductor 8 through conductor 18, resistor R2, an active amplifying element, such as NPN transistor Q1, and conductor 19. The emitter of the transistor Q1 is connected to resistor R2. The collector of transistor Q1 is connected through conductor 19 to conductor 8. The base of transistor Q1 is connected through negative feedback circuit comprising diodes D1, D2, resistor R5 and conductor 21 coupled to conductor 18.

An alternating current feedback path is provided from the base to the emitter of the transistor. More particularly, the base of transistor Q1 is coupled through capacitor C2, resistor R3 and conductor 21 to the junction of the transmitter and conductor 18. Resistor R4 connects the junction of capacitor C2 and resistor R3 to conductor 9.

On short loops where the loop current is large, the diodes D1, D2 and the resistor R5 provide a negative feedback for reducing the gain of transistor Q1. Loop current increases add to the voltage drop across resistor R2. This causes diodes D1 and D2 to conduct and the direct current passes through the resistor R6 coupled between conductor 8 and the base of transistor Q1, over the feedback circuit previously described including diodes D1, D2 and resistor R5. The added current increases voltage drop across the transistor Q1 which reduces loop current on short loops. An increase in D.C. current through diodes D1, D2 and resistor R5 on short loops decreases the gain of transistor Q1 thereby decreasing the level of the transmitted signal.

Transistor Q1 also controls the impedance match for received signals. The receiver 22 is connected to the emitter of transistor Q1 by conductor 23 and to the collector of transistor Q1 over a circuit that includes conductor 24, capacitor C1, resistor R1 and conductor 8. The receiver is shown bridged by a suppressor 35 and the well known muting contacts 20.

The speech signals received on the lines L1 and L2 are coupled to one side of the receiver through resistor R1 and capacitor C1. The other side of the receiver is coupled to the other side of the telephone line through resistor R2 and the parallel combination of transmitter 16 and resistors R3 and R4. The received speech signals also partially pass through transistor Q1, which increases the impedance of the network to the normal specified impedance; e.g., 600 Ohms.

Thus, the circuit described provides the proper amplified transmission signals, matches the line impedance in the receiving condition due to the passage of the received signal through transistor Q1 and also automatically provides side tone to the receiver 22 for the transmitting condition. More particularly, the transmitted speech signal appearing on the emitter of transistor Q1 is almost of the same amplitude as that appearing on the collector of the transistor during transmission. This attentuated signal is coupled to the receiver through resistor R1 and capacitor C1 causing a side tone to be heard in the receiver.

While the rotary dialing network has been shown in FIG. 1, the same principle is applied to multi-frequency dial tone systems, as shown in FIG. 2. Therein the telephone line is shown as comprising lines L1 and L2. The ringer circuitry is shown as ringer 13. A suppressor D16 is shown across the telephone lines on the network side of the hook switch contacts HS-1 and HS-2. A bridge circuit 12 comprising diodes D11, D12, D13 and D14 is shown as being coupled across the telephone lines L1 and L2 and through hook switch contacts HS-1, and HS-2. The transmitter 16 is coupled directly to conductor 9 through conductor 17. The other side of transmitter 16 is coupled to the emitter of NPN transistor Q1 through resistor R2. The collector of transistor Q1 is coupled to conductor 10. Conductor 10 is coupled to conductor 8 by the normally closed contacts 26 in the keypad 27. The receiver 22 bridged by suppressor 35 is shown coupled through conductor 28, contacts 29, conductor 31, capacitor C1, resistor R1 and conductor 10 from the junction of resistor R2 and the emitter of transistor Q1 to conductor 10. Contacts 29 are bridged by resistor R16. Thus, normally the receiver and its accompanying resistor-capacitor circuit made up of R1, C1 bridges transistor Q1.

The feedback circuits control the gain of the transistor Q1 and the impedance of the lines is matched in the same manner as described with regard to FIG. 1. In the circuitry of FIG. 2, a PNP transistor Q2 is provided which bridges the telephone lines on the network side of the bridge and provides a bypass for D.C. current. More particularly, a circuit is provided which goes from conductor 8 through resistor R17 to the emitter of transistor Q2. The collector of transistor Q2 is coupled through conductor 30 to conductor 9. The base of transistor Q2 is connected through conductor 32, conductor 10 and contacts 26 to conductor 8.

In operation, either the circuit of FIG. 1 or the circuit of FIG. 2, depending on the dial operation, provide a subscriber station telephone network that transmits voice signals at a relative constant amplitude level regardless of the line length. In addition, the one transistor that controls the transmitted signal amplitude also acts to provide impedance matching for the network in the receive condition and to provide the required side tone.

The transistor Q2 decreases the voltage drop across the network by by-passing some of the direct current.

The simplified showing of the key pad 27 in FIG. 2 shows the transmitter connected through conductor 17 to the oscillator of the dual tone multi-frequency generator; and more particularly, the PNP transistor Q3. The emitter of transistor Q3 is coupled through resistor R21 inductors L4, L3 and the normally open contact of contacts 26 to conductor 8. The normally open contacts of contacts 26 is coupled through voltage suppressor D8 and inductors L5 and L6 to the base of transistor Q3. The base and collector of transistor Q3 are coupled by capacitor C21. The junction of voltage suppressor D8 and inductor L5 is coupled via resistor R10, line 42, inductors L2, L1 and the normally closed common contact 51 of the key pad 27, to conductor 43. Conductor 43 is connected to conductor 9. A voltage suppressor D7 is connected between conductors 42 and 43.

Typical component values in the circuitry of FIG. 1 are:

| R1 = 470 Ohms | C1 = 3.3 μFd. |
|---|---|
| R2 = 18 Ohms | C2 = 20 μFd. |
| R3 = 62 Ohms | C6 = 250 PF |
| R4 = 820 Ohms | Q1 is GE D40 D11 |
| R5 = 30 Ohms | |
| R6 = 1.5 K | |

While the principles of the invention have been described above in connection with specific apparatus and applications, it is to be understood that this description is made by way of example only and not as a limitation on the scope of the invention.

What is claimed is:

1. A subscriber station network for controlling signals transmitted and/or received over telephone lines,
said network comprising a pair of line terminals connecting said network to said telephone lines,
transmitter means for transmitting signals through said pair of line terminals,
receiver means for receiving signals through said pair of line terminals,
amplifying means for use in controlling the amplitude of said signals,
means for coupling said amplifying means in series with said transmitter means across said pair of line terminals, and receiver coupling means for coupling said receiver means across said amplifying means, whereby cancellation of transmitted signals received by the receiver means occurs and side tone at said receiver means is controlled.

2. The subscriber station network of claim 1 including A.C. gain control means connected to said amplifying means, and
said A.C. gain control means operated as a function of the input signal from said transmitter means.

3. The subscriber station network of claim 1 including D.C. gain control means coupled to said amplifying means, and
said D.C. gain control means operated to control the gain of said amplifying means as a function of D.C. current on the telephone lines.

4. The subscriber station network of claim 1 wherein said receiver coupling means and said means for coupling said amplifying means comprises circuit means for matching the impedance of said telephone lines.

5. The subscriber station network of claim 4 including dual tone multi-frequency dialing means,
said dual tone multi-frequency dialing means connected between said pair of line terminals, and
bypass transistor means coupled across said pair of line terminals for providing a D.C. current bypass path.

6. A subscriber station network for controlling signals transmitted and/or received over telephone lines,
said network comprising a pair of line terminals connecting said network to said telephone lines,
transmitter means having at least one side and an other side for transmitting signals through said line terminals,
receiver means connected to receive signals through said line terminals,
amplifying means for use in controlling the amplitude of the signals,
means for coupling said amplifying means in series with said transmitting means across said line terminals,
said amplifying means comprising a transistor,
said means for coupling said amplifying means comprising means coupling the collector of said transistor to one of said pair of line terminals,
means connecting the emitter of said transistor through a first resistor to said one side of said transmitter means, and
means connecting the other side of said transmitter means to the other of said pair of line terminals, and
gain control means connected to the base of said transistor for controlling the gain of said transistor.

7. The subscriber station network of claim 6 wherein said gain control means comprises A.C. gain control means, and
said A.C. gain control means including series resistor and capacitor means coupled between the junction of said transmitter means and said first resistor and the base of said transistor.

8. The subscriber station network of claim 6 wherein said gain control means comprises D.C. gain control means, and
said D.C. gain control means including a series connection of diode and second resistor means coupled between the junction of said first resistor and said transmitter means and the base of said transistor, whereby the amplifier gain is automatically controlled as a function of loop current.

9. A subscriber station network for controlling signals transmitted and/or received over telephone lines,
said network comprising a pair of line terminals connecting said network to said telephone lines,
transmitter means for transmitting signals through said line terminals,
receiver means for receiving signals through said line terminals,
amplifying means for use in controlling the amplitude of said signals and the impedance of the network for impedance matching the network with the impedance of the telephone lines,
means for coupling said amplifying means across said pair of line terminals,
receiver coupling means for coupling said receiver across said amplifier means, and
means for controlling said amplifier means to bypass a portion of the received signal, thereby controlling the impedance of the network.

10. The subscriber station network of claim 9 wherein said amplifying means comprises transistor means with the collector connected to one of said pair of line terminals,
the emitter of said transistor connected through first resistor means to the other of said line terminals, and
impedance means for connecting the base of said transistor means to the first of said line terminals.

11. The subscriber station network of claim 10 wherein said receiver means has at least one side and an other side, and wherein said receiver coupling means comprises means for coupling one side of the receiver means to the emitter of said transistor, and
means for coupling the other side of said receiver means to the collector of said transistor through a series resistor capacitor circuit.

* * * * *